(12) United States Patent
Chen

(10) Patent No.: US 9,861,853 B2
(45) Date of Patent: Jan. 9, 2018

(54) TURBINE DAMPING DEVICE

(71) Applicant: ZHONGSHAN SHENGDONGLI CO., LTD., Zhongshan, Guangdong (CN)

(72) Inventor: Yongjun Chen, Zhongshan (CN)

(73) Assignee: ZHONGSHAN SHENGDONGLI CO., LTD., Zhongshan (CN)

( * ) Notice: Subject to any disclaimer, the term of this patent is extended or adjusted under 35 U.S.C. 154(b) by 243 days.

(21) Appl. No.: 14/852,620

(22) Filed: Sep. 13, 2015

(65) Prior Publication Data

US 2016/0208638 A1    Jul. 21, 2016

(30) Foreign Application Priority Data

Jan. 16, 2015    (CN) .......................... 2015 1 0022815

(51) Int. Cl.
| | |
|---|---|
| A63B 22/06 | (2006.01) |
| A63B 21/008 | (2006.01) |
| A63B 21/22 | (2006.01) |
| A63B 21/00 | (2006.01) |
| A63B 22/00 | (2006.01) |
| G06Q 30/02 | (2012.01) |

(52) U.S. Cl.
CPC .... *A63B 22/0605* (2013.01); *A63B 21/00069* (2013.01); *A63B 21/0088* (2013.01); *A63B 21/22* (2013.01); *A63B 21/152* (2013.01); *A63B 21/153* (2013.01); *A63B 21/157* (2013.01); *A63B 21/225* (2013.01); *A63B 22/0076* (2013.01); *A63B 22/0087* (2013.01); *A63B 2022/0079* (2013.01); *A63B 2210/50* (2013.01); *A63B 2225/09* (2013.01); *G06Q 30/02* (2013.01)

(58) Field of Classification Search
CPC ............ A63B 22/0605; A63B 22/0076; A63B 22/0087; A63B 21/00069; A63B 21/0088; A63B 21/22; A63B 21/152; A63B 21/153; A63B 21/157; A63B 21/225; A63B 2022/0079; A63B 2210/50; A63B 2225/09; G06Q 30/02
USPC ...... 188/290, 293, 296; 482/58, 59, 73, 111, 482/112, 113
See application file for complete search history.

(56) References Cited

U.S. PATENT DOCUMENTS 5,328,422 A * 7/1994 Nichols ................ A63B 22/001
482/111

* cited by examiner

*Primary Examiner* — Richard Edgar
(74) *Attorney, Agent, or Firm* — Pai Patent & Trademark Law Firm; Chao-Chang David Pai

(57) ABSTRACT

A turbine damping device is mounted on a fitness device, and has a housing assembly, a turbine assembly, and a regulating unit. The turbine assembly is mounted inside the housing assembly and has a turbo casing, a turbo wheel, and an adjusting plate. The turbo casing has an exhaling hole. The adjusting plate is controlled by the regulating unit and mounted movably in the exhaling hole. The turbo wheel is mounted rotatably inside the turbo casing. The turbo casing and the turbo wheel generate an airflow resistance that is an exercising load for users using the fitness device. The adjusting plate regulates an opening size of the exhaling hole to adjust the airflow resistance. The turbine damping device has a simple structure and maintenance thereof is easy. A user adjusts the exercising load easily by controlling the adjusting plate. The fitness device with airflow resistance is helpful to environmental protections.

5 Claims, 6 Drawing Sheets

TURBINE DAMPING DEVICE

BACKGROUND OF THE INVENTION

1. Field of the Invention

The present invention relates to a turbine damping device, and more particularly to a turbine damping device that is mounted on a fitness device.

2. Description of the Related Art

A conventional fitness device usually produces resistance by magnets. The magnets are made from rare-earth metal. However, mining and processing of the rare-earth metal produces environmental pollutions and thus poses concerns on marketing of such fitness devices with magnets.

SUMMARY OF THE INVENTION

An objective of the present invention is to provide a turbine damping device that is mounted on a fitness device, generates an airflow resistance instead of a magnetic resistance, and can be maintained easily.

To achieve the foregoing objective, the turbine damping device is mounted on a fitness device, and the turbine damping device comprises a housing assembly, a turbine assembly, a shaft, a shaft driving assembly, and a regulating unit. The turbine assembly is mounted inside the housing assembly, and has a turbo casing, a turbo wheel, and an adjusting plate. The turbo casing has an inhaling hole that is defined on a side surface of the turbo casing and an exhaling hole that is defined on a circumferential edge of the turbo casing. The turbo wheel is mounted inside the turbo casing. The adjusting plate is mounted movably in the exhaling hole. The shaft is mounted through the turbo wheel axially. The shaft rotates with the turbo wheel. Both ends of the shaft are mounted rotatably inside the housing assembly. The shaft driving assembly is mounted on one end of the shaft that extends out of the turbo casing. The regulating unit connects and drives the adjusting plate to regulate an opening size of the exhaling hole.

Other objectives, advantages and novel features of the invention will become more apparent from the following detailed description when taken in conjunction with the accompanying drawings.

DETAILED DESCRIPTION OF THE INVENTION

Figure 1:
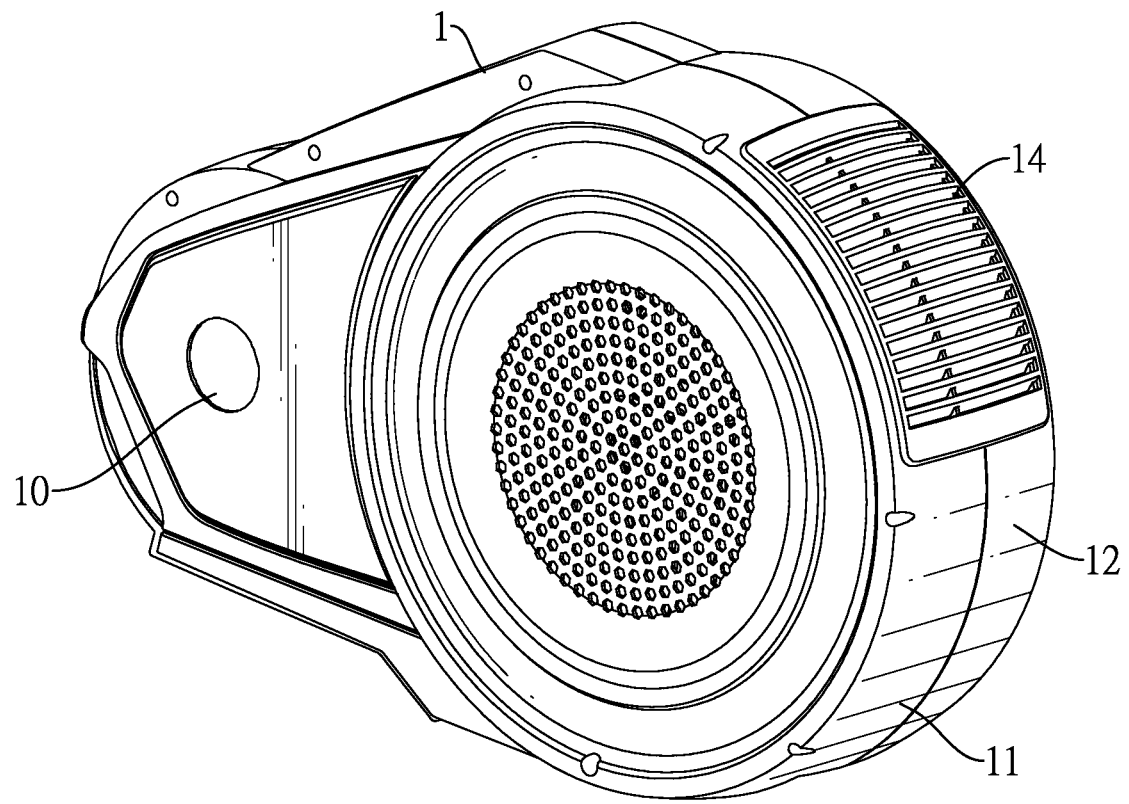
FIG. 1 is a perspective view of a first embodiment of a turbine damping device in accordance with the present invention.
Figure 2:
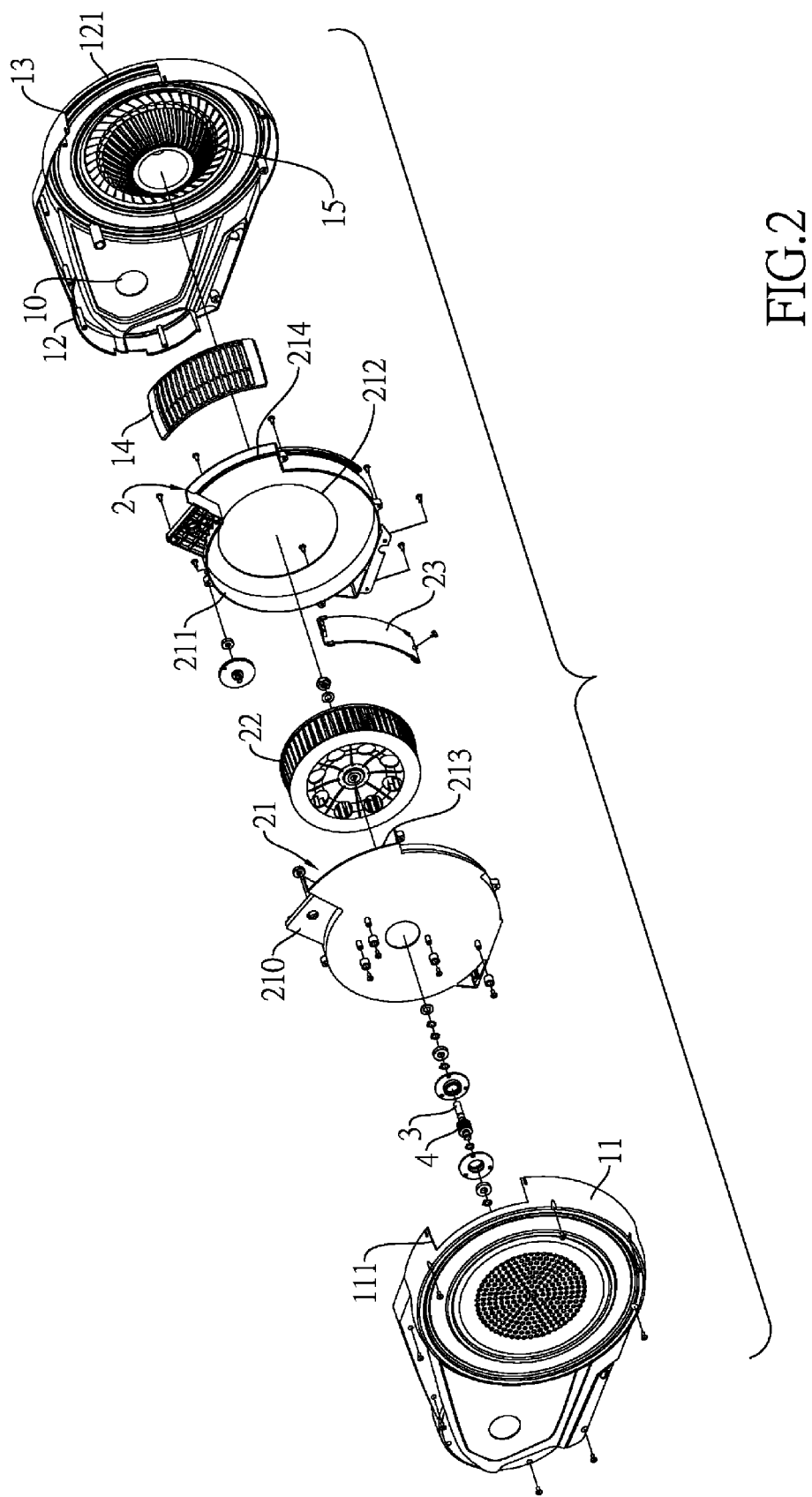
FIG. 2 is an exploded perspective view of the turbine damping device in FIG. 1.
Figure 3:
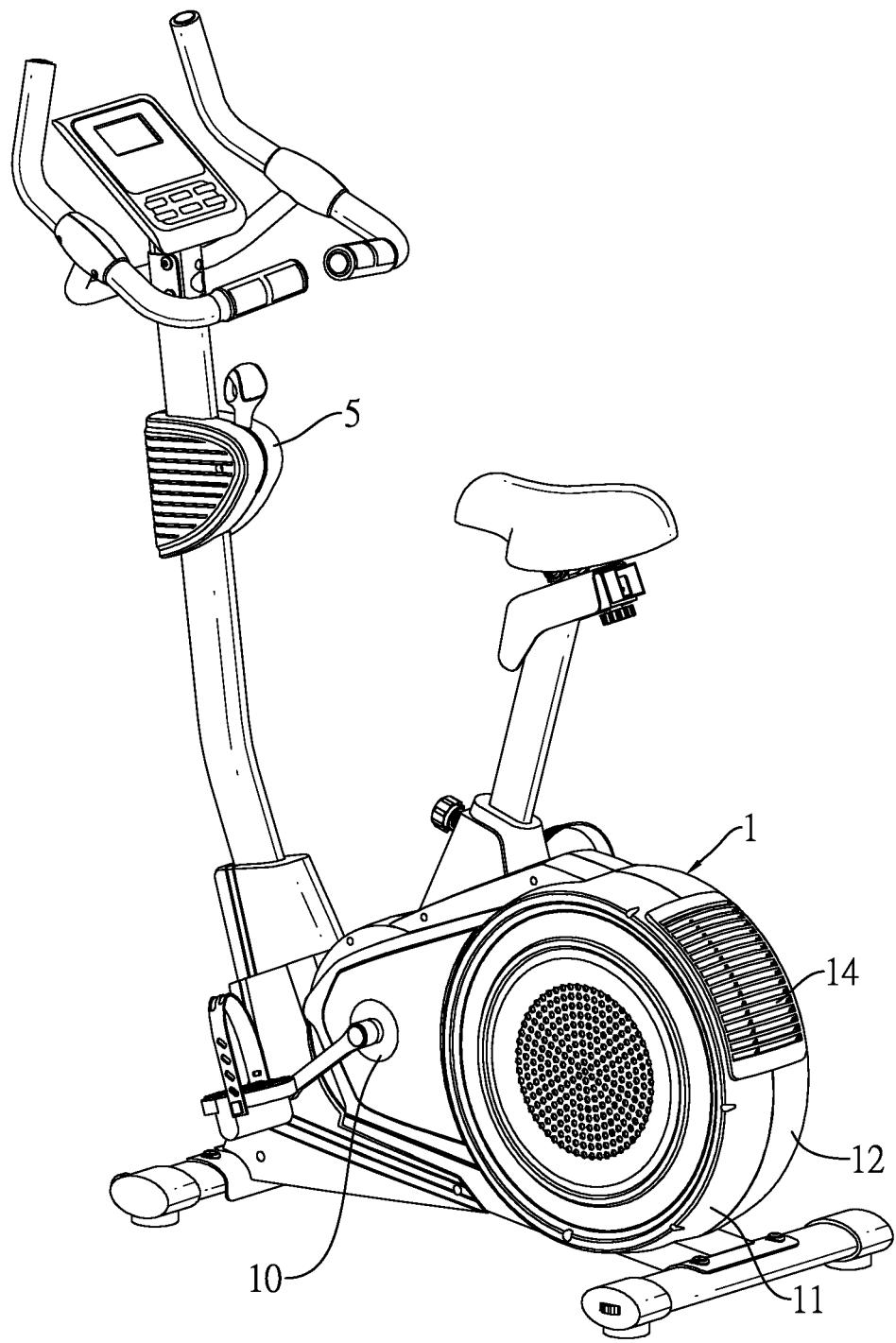
FIG. 3 is a perspective view of the turbine damping device in FIG. 1, shown mounted on an exercise bike.
Figure 4:
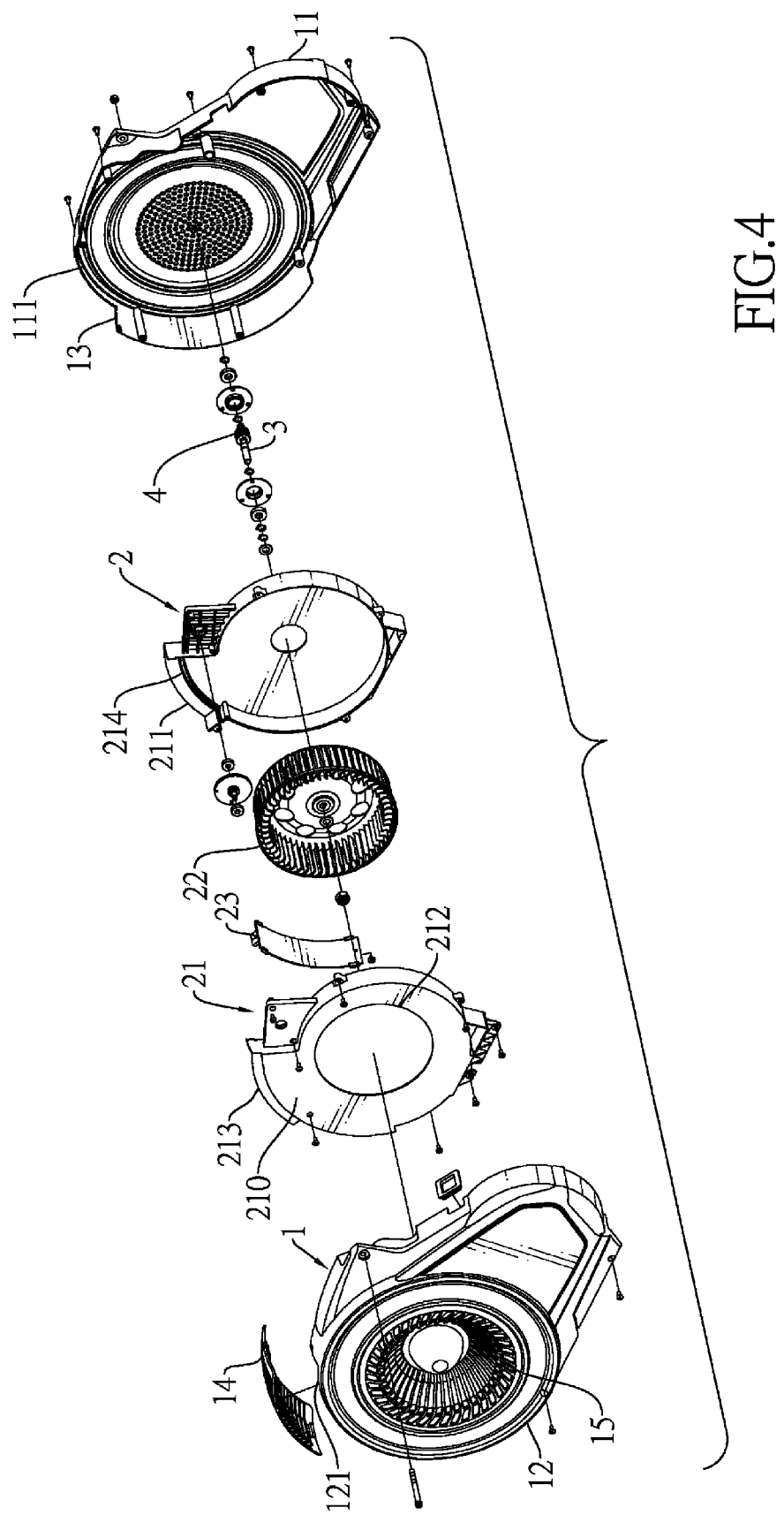
FIG. 4 is an exploded perspective view of a second embodiment of the turbine damping device in accordance with the present invention.
Figure 5:
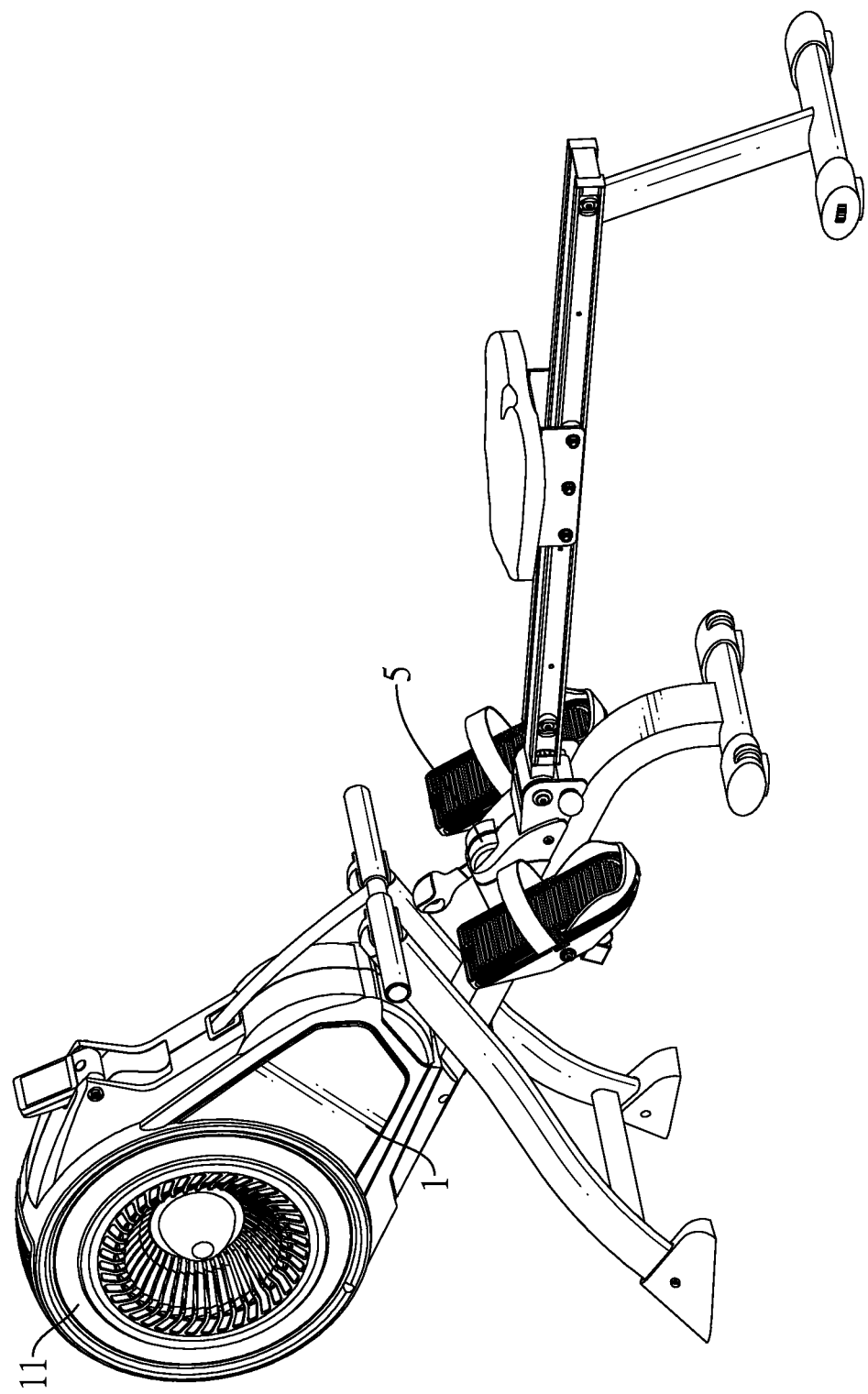
FIG. 5 is a perspective view of the turbine damping device in FIG. 4, shown mounted on a rowing machine.

With reference to FIGS. 1, 2 and 4, a turbine damping device in accordance with the present invention is mounted on a fitness device, and has a housing assembly 1, a turbine assembly 2, a shaft 3, and a shaft driving assembly 4. The fitness device may be an exercise bike or a rowing machine, as shown in FIGS. 3 and 5.

With reference to FIGS. 1 to 3, the housing assembly 1 has a first housing part 11, a second housing part 12, an outlet hole 13, a baffle 14, multiple inlet holes 15, and a mounting hole 10.

The first housing part 11 has a first recess 111 that is defined on a circumferential edge of the first housing part 11.

The second housing part 12 is mounted on the first housing part 11, and has a second recess 121 that is defined on a circumferential edge of the second housing part 12. The second recess 121 corresponds to the first recess 111 to form the outlet hole 13 that is defined on a circumferential edge of the housing assembly 1.

The baffle 14 has multiple through holes and is mounted in the outlet hole 13.

The inlet holes 15 are defined on the first housing part 11 and the second housing part 12.

The mounting hole 10 is defined on the housing assembly 1, thereby making the present invention easy to be mounted on the fitness device. Specifically, the fitness device is an exercise bike.

With reference to FIGS. 2 and 4, the turbine assembly 2 is mounted inside the housing assembly 1 and has a turbo casing 21, a turbo wheel 22, and an adjusting plate 23.

The turbo casing 21 has a first casing part 210, a second casing part 211, an inhaling hole 212, and an exhaling hole 213.

The first casing part 210 corresponds to the first housing part 11 of the housing assembly 1.

The second casing part 211 is mounted on the first casing part 210, and corresponds to the second housing part 12.

The inhaling hole 212 is defined on a side surface of the second casing part 211, and communicates with the inlet holes 15 of the housing assembly 1. The exhaling hole 213 is defined on a circumferential edge of the turbo casing 21, and corresponds to the outlet hole 13 of the housing assembly 1.

The turbo wheel 22 is mounted inside the turbo casing 21.

The adjusting plate 23 is mounted movably in the exhaling hole 213.

The turbo casing 21 may further have a sliding groove 214 that is defined in an inner wall of the exhaling hole 213. The adjusting plate 23 is mounted slidably in the sliding groove 214 to regulate an opening size of the exhaling hole 213.

The turbo casing 21 may further have multiple rollers instead of the sliding groove 214. The rollers are mounted in the exhaling hole 213. The adjusting plate 23 is mounted slidably in the rollers to regulate the opening size of the exhaling hole 213.

With reference to FIGS. 2 and 4, the shaft 3 is mounted through the turbo wheel 22 axially and rotates with the turbo wheel 22. Both ends of the shaft 3 are mounted rotatably inside the housing assembly 1.

The shaft 3 may further have a weight, a rolling wheel, and a rope. The rolling wheel is mounted on the housing assembly 1. The rope is mounted on the rolling wheel and connects the weight to the shaft 3.

The shaft driving assembly 4 is mounted on one end of the shaft 3, and said end of the shaft 3 extends out of the turbo casing 21. The shaft driving assembly 4 may be a belt pulley transmission or a sprocket wheel transmission.

Figure 6:
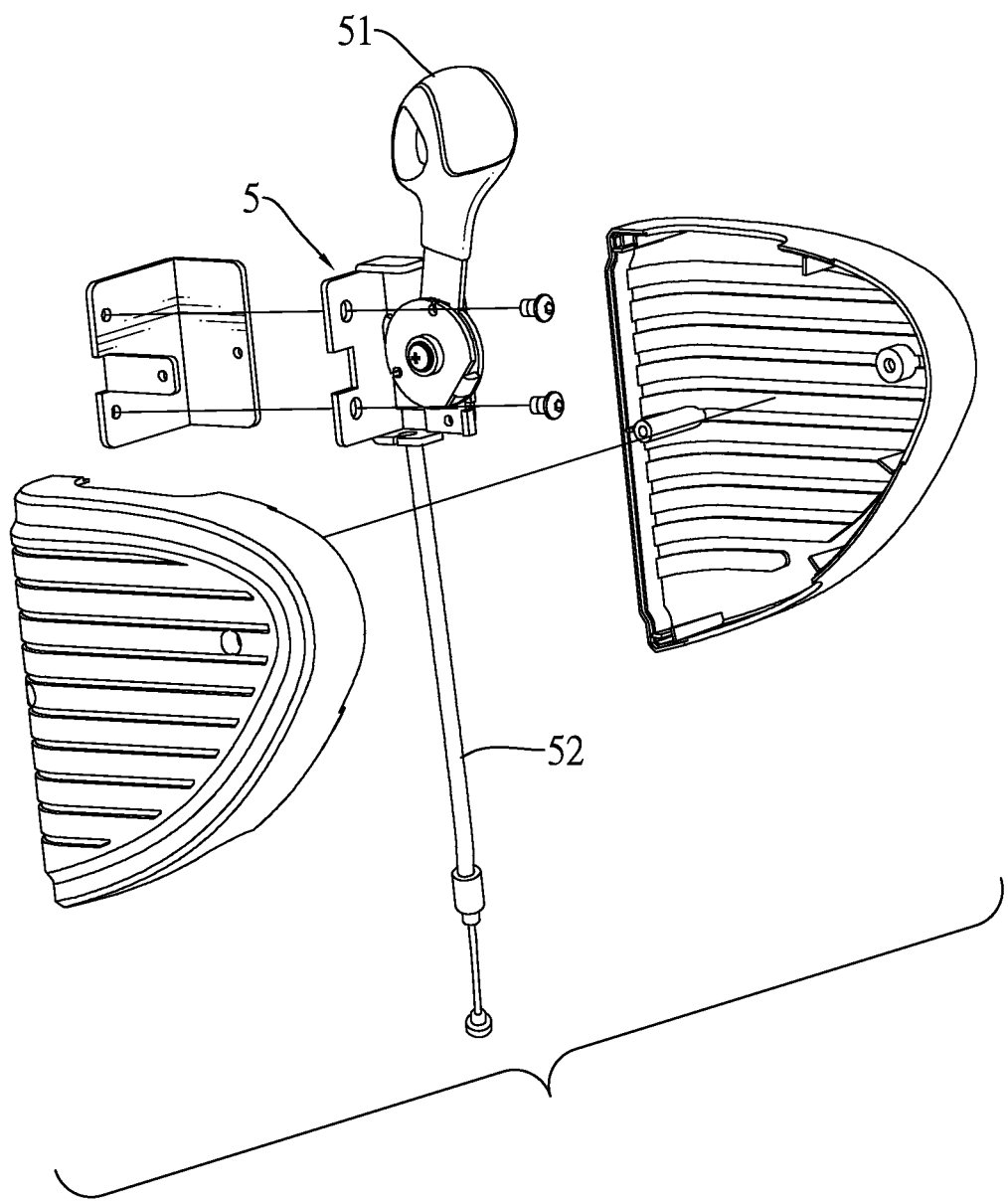
FIG. 6 is an exploded perspective view of a damping regulator of the turbine damping device in FIG. 3.

With reference to FIGS. 3, 5 and 6, the turbine damping device further has a regulating unit. The regulating unit may be a damping regulator 5. The damping regulator has a handle 51 and a cord 52.

The handle 51 is mounted rotatably in the damping regulator 5. The cord 52 is mounted on the handle 51 and connects to both ends of the adjusting plate 23. The handle 51 drives the adjusting plate 23 to slide to regulate an opening size of the exhaling hole 213.

The regulating unit may be a manual handle. One of two ends of the manual handle is mounted on the adjusting plate 23. The other end of the manual handle extends out of the exhaling hole 213 of the turbo casing 21 and the housing assembly 1.

The turbine assembly 2 generates airflow and encounters reaction force from the airflow such that the fitness device produces resistance from the turbine assembly 2 to allow an exerciser to work out with more effort. Furthermore, the fitness device works on airflow resistance, which is helpful to environmental protections and thus positive for marketing. A user regulates the opening size of the exhaling hole 213 easily with the damping regulator 5 to adjust airflow resistance. The turbine damping device of the present invention has a simple structure, facilitating ease of maintenance. The turbine damping device can be applied on an exercise bike, a rowing machine, a ski simulator and so on.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A turbine damping device for a fitness device, the turbine damping device comprising:
    a housing assembly;
    a turbine assembly mounted inside the housing assembly and having
        a turbo casing having
            an inhaling hole defined on a side surface of the turbo casing; and
            an exhaling hole defined on a circumferential edge of the turbo casing;
        a turbo wheel mounted inside the turbo casing; and
        an adjusting plate mounted movably in the exhaling hole;
    a shaft mounted through the turbo wheel axially, wherein the shaft rotates with the turbo wheel and both ends of the shaft are mounted rotatably inside the housing assembly;
    a shaft driving assembly mounted on one of the ends of the shaft that extends out of the turbo casing; and
    a regulating unit connecting and driving the adjusting plate to regulate an opening size of the exhaling hole, wherein
    the housing assembly has
        multiple inlet holes defined on the housing assembly and communicating with the inhaling hole of the turbo casing;
        an outlet hole defined on a circumferential edge of the housing assembly and corresponding to the exhaling hole of the turbo casing; and
        a baffle having multiple through holes and mounted in the outlet hole.

2. The turbine damping device as claimed in claim 1, wherein
    the turbo casing has
        a first casing part; and
        a second casing part mounted on the first casing part; and
    the housing assembly has
        a first housing part corresponding to the first casing part, and having a first recess defined on a circumferential edge of the first housing part; and
        a second housing part mounted on the first housing part, having a second recess defined on a circumferential edge of the second housing part, and corresponding to the second casing part, wherein the inlet holes are defined on the first housing part and the second housing part, and the first recess corresponds to the second recess to form the outlet hole.

3. The turbine damping device as claimed in claim 1, wherein
    the turbo casing further has a sliding groove defined in an inner wall of the exhaling hole;
    the adjusting plate is mounted slidably in the sliding groove to regulate the opening size of the exhaling hole.

4. The turbine damping device as claimed in claim 1, wherein the housing assembly has a mounting hole defined on the housing assembly for mounting the housing assembly on the fitness device.

5. The turbine damping device as claimed in claim 1, wherein the regulating unit is a damping regulator, and the damping regulator has
    a handle mounted rotatably in the damping regulator; and
    a cord mounted on the handle and connecting to the adjusting plate, wherein the handle drives the adjusting plate to slide to regulate the opening size of the exhaling hole, and both ends of the adjusting plate connect the handle with the cord.

* * * * *